3,100,200
PROCESS FOR POLYMERIZATION OF ACRYLIC ESTERS WITH CATALYSTS COMPRISING METAL HALIDES AND GROUP II METALS
Lon T. Smith, Bartlesville, Okla., assignor to Phillips Petroleum Company, a corporation of Delaware
No Drawing. Filed Sept. 14, 1959, Ser. No. 839,581
15 Claims. (Cl. 260—89.5)

This invention relates to a process for the polymerization of acrylic esters utilizing novel catalysts in this reaction.

Polymers of acrylic esters such as methyl acrylate, methyl methacrylate, and the like have found wide application in the plastics art for the manufacture of sheet materials, powder moldings, adhesives, fibers, coatings, leather finishing, and the like. Heretofore, acrylic esters have been polymerized in the presence of organic peroxidic materials such as benzoyl peroxide, acetyl peroxide, lauryl peroxide, and the like.

It is an object of the invention to provide a process for polymerizing acrylic esters utilizing novel catalysts for this reaction. A further object is to provide a method for polymerizing acrylic esters in the presence of improved novel catalysts. Other objects of the invention will become apparent upon consideration of the accompanying disclosure.

I have discovered that acrylic esters are polymerized to solid and highly viscous resins in contact with catalysts comprising a halide of a metal selected from the group consisting of titanium, zirconium, tin, and vanadium combined with a metal selected from the group consisting of magnesium, zinc, cadmium, and carbonates of said metals. The metal halides used are the chlorides, bromides, and iodides, preferably the tetrahalides and still more desirably the tetrachlorides. In any case, the halide employed will be one which is at least partially soluble in the solvent employed.

The metals or metal carbonates employed are usually added in pulverulent form, preferably ground to pass a 50 mesh or finer screen, although in some instances metal shavings can be used.

The mole ratio of titanium, zirconium, tin, and vanadium halide to metal or metal carbonate in the range of 0.1 to 5.0, preferably in the range of 1.0 to 1.5, gives good results. When a metal component is used in the form of shavings, a somewhat larger amount of the metal is employed than when employed in a more finely divided form. The amount of total catalyst used is generally in the range of 0.01 to 10 moles per mole of acrylic ester monomer, although larger or smaller amounts can be used.

It is usually preferred to conduct the reaction in a solvent such as a paraffinic, cycloparaffinic, or aromatic hydrocarbon, or a cyclic ether. Such solvents include n-heptane, cyclohexane, benezene, toluene, dioxane, tetrahydrofuran, and the like. Alcohols are not suitable solvents since they hydrolyze $TiCl_4$ and $SnCl_4$ and slowly decompose them. The amount of solvent to be used varies over a broad range, generally from about one to as much as ten parts by weight per part of acrylic ester monomer, although greater or lesser amounts can be used when desired.

The polymerization is carried out at a temperature in the range of 0° C. to 250° C., preferably, in the range of 25° C. to 150° C. Polymerization time is in the range of about one to 500 hours.

The acrylic esters polymerized by the catalysts of the present invention include methyl acrylate, ethyl acrylate, butyl acrylate, hexyl acrylate, decyl acrylate, octadecyl acrylate, and corresponding methacrylates.

In a process using the catalysts of the invention, the solvent, monomer, and catalyst are charged to a reactor equipped with a suitable agitating means, preferably under a blanket of inert gas such as nitrogen, the temperature elevated to the desired level and so maintained during the reaction period. The reactor is then cooled and the polymer removed and washed with acetone or alcohol, say in a comminuting device such as a Waring Blendor. The pulverized polymer is then recovered on a filter, washed, and dried.

It is preferred that the monomer, solvent, and catalyst be substantially moisture free, and suitable precautions should be observed in the charging procedure to exclude contamination with water.

Two or more of the esters may be incorporated in the reaction mixture to form copolymers, whereas if a single ester is polymerized, the homopolymer is formed.

The following specific examples are presented to illustrate the invention and are not to be construed as unnecessarily limiting the same.

*Example I*

To each of two reactors was charged 15 ml. cyclohexane, one gram of zinc dust and one milliliter (2.23 gm.) stannic chloride. To one reactor was charged three milliliters of methyl acrylate, the other being maintained as a control. An immediate reaction was initiated in the reactor to which the methyl acrylate was charged, the temperature rising as the reaction proceeded. The reactors were then heated at 60° C. for 90 hours after which they were cooled to room temperatures. A white solid formed in the reactor to which the methyl acrylate had been added, none in the control. At this point, two milliliters of methyl acrylate was charged to the system used as a control. A white solid formed, filling the supernatant liquid.

*Example II*

To a glass reactor was charged four grams of zinc dust, 15.4 grams of stannic chloride, and 100 ml. dry cyclohexane. After mixing these components, 42 grams of methyl acrylate was charged. A white precipitate was formed. The reactor was sealed. Reaction continued with considerable evolution of heat. After the reaction subsided, the reactor was heated at 70° C. for 18 hours after which it was cooled to room temperature, and opened. Accumulations of polymer were scraped from the sides of the reactor after which it was again closed and allowed to stand at room temperature for 24 hours. When opened, large accumulations of polymer were found adhering to the catalyst and to the walls of the vessel.

*Example III*

To a reactor was charged 100 ml. cyclohexane, 0.5 gram zinc dust, and 0.3 ml. titanium tetrachloride, followed by 25 ml. methyl acrylate. After 96 hours at room temperature polymer had formed in the reactor. The polymer was extracted with acetone, toluene, and refluxed with tetralin. Melting point of the polymer so obtained was between 200° and 225° C. When the melt was cooled, it solidified at about 40° C. This product was soluble in acetone at room temperature, demonstrating that crosslinking had not occurred.

*Example IV*

Another run similar to that of Example III was made substituting 100 ml. dioxane as solvent. To the solvent was added the zinc dust and stannic chloride. The temperature was raised to 70° C. and maintained at that level for 18 hours. The solution became quite viscous with dissolved polymer. The solution was removed, filtered, and poured into water, in which the solid polymer precipitated. This solid was recovered and dried.

Example V

A series of tests was made in which reaction vessels were charged with 10 ml. cyclohexane, 0.1 ml. of TiCl₄ or SnCl₄, and 0.1 gram of a second catalyst component. To each vessel was added 3 ml. methyl acrylate after which the systems were flushed with nitrogen and sealed. The reactors were maintained at room temperature for 500 hours. Data on these tests are shown below:

| $SnCl_4$ (ml) | $TiCl_4$ (ml) | Second component | Result |
|---|---|---|---|
| 0.1 | ---- | Zn dust | Solid polymer. |
| 0.1 | ---- | Mg turnings | Do. |
| 0.1 | ---- | None | None. |
| 0.1 | ---- | AlCl₃ | Do. |
| 0.1 | ---- | FeCl₃·H₂O | Do. |
| ---- | 0.1 | Zn dust | Solid polymers. |
| ---- | 0.1 | Mg turnings | Viscous oil. |
| ---- | 0.1 | None | Red solution. |
| ---- | 0.1 | AlCl₃ | Oily coating on walls. |
| ---- | 0.1 | FeCl₃·H₂O | None. |

Example VI

Another series of runs was made in which the vessels were charged with 5 ml. dry cyclohexane, a small amount of inorganic solid, and 0.1 ml. stannic chloride or titanium tetrachloride. To each vessel was then charged 3 ml. distilled and dried methyl acrylate. The vessels were sealed and the temperature adjusted to a suitable level and maintained under reaction temperature for a measured length of time. Data on these tests are shown below.

| Run | $TiCl_4$ (ml.) | $SnCl_4$ (ml.) | Inorganic solid | Temp. (° C.) | Result |
|---|---|---|---|---|---|
| 1 | ---- | 0.1 | CdCO₃ | (a) | Solid polymer. |
| 2 | ---- | 0.1 | ZnCO₃ | (a) | Do. |
| 3 | 0.1 | ---- | MgCO₃ | (b) | Sticky product. |
| 4 | ---- | ---- | Zn | (c) | Solid polymer. | a 4 hours room temperature, 24 hours at 75° C., 72 hours at room temperature.
b 72 hours at room temperature, 24 hours at 75° C.
c 18 hours at 70° C.

Certain modifications of the invention will become apparent to those skilled in the art and the illustrative details disclosed are not to be construed as imposing unnecessary limitations on the invention.

I claim:

1. A process for polymerizing acrylic esters which comprises contacting under anhydrous polymerizing conditions an acrylic ester selected from the group consisting of methyl, ethyl, butyl, hexyl, decyl, and octadecyl acrylates and methacrylates as the sole polymerization material with a catalyst consisting essentially of an inorganic halide of tin, said halide being selected from the group consisting of chloride, iodide, and bromide, and a second member selected from the group consisting of magnesium, zinc, cadmium, and carbonates of these metals at a temperature in the range of 0 to 250° F. for a time in the range of 1 to 500 hours, the mol ratio of tin halide to the second catalyst member being in the range of 0.1 to 5.0, and the total amount of catalyst being in the range of 0.01 to 10 mols per mol of monomer so as to form a solid homopolymer of said ester; and recovering the homopolymer product.

2. The process of claim 1 wherein said tin halide is dissolved in a liquid solvent inert in the process and said other member is dispersed in solid particulate form in said solvent.

3. The process of claim 2 wherein said solvent is a hydrocarbon.

4. The process of claim 3 wherein said solvent is a cycloparaffin.

5. The process of claim 2 wherein said solvent and ester are contacted in an enclosed reaction chamber from which air has been displaced by a gaseous ambient inert to said solvent and ester.

6. The process of claim 1 wherein said catalyst comprises SnCl₄ dissolved in a solvent inert in the process and zinc dust dispersed therein.

7. The process of claim 1 wherein said ester is methyl acrylate, said tin halide is SnCl₄, and same is dissolved in a liquid solvent inert in the process.

8. The process of claim 7 wherein said solvent is cyclohexane.

9. The process of claim 7 wherein said solvent is dioxane.

10. The process of claim 1 wherein said catalyst comprises SnCl₄ and magnesium.

11. The process of claim 1 wherein said catalyst comprises SnCl₄ and CdCO₃.

12. The process of claim 1 wherein said catalyst comprises SnCl₄ and ZnCO₃.

13. The process of claim 1 wherein said tin halide is the chloride.

14. The process of claim 1 wherein said tin halide is the iodide.

15. The process of claim 1 wherein said tin halide is the bromide.

References Cited in the file of this patent

UNITED STATES PATENTS

| 2,846,427 | Findlay | Aug. 5, 1958 |
| 2,910,461 | Nowlin et al. | Oct. 27, 1959 |

FOREIGN PATENTS

| 566,713 | Belgium | Apr. 30, 1958 |

OTHER REFERENCES

Landler: Recueil des Travaux Chemiques des Pays-Bas, vol. 68, pages 992–998.